United States Patent [19]
Post et al.

[11] Patent Number: 5,261,025
[45] Date of Patent: Nov. 9, 1993

[54] METHOD AND APPARATUS FOR DC MOTOR SPEED CONTROL

[75] Inventors: Stephen F. Post, Pleasant Hill; David Mele, Fremont, both of Calif.

[73] Assignee: Curtis Instruments, Inc., Mt. Kisco, N.Y.

[21] Appl. No.: 299,049

[22] Filed: Jan. 19, 1989

[51] Int. Cl.⁵ ............................................. H02P 5/00
[52] U.S. Cl. ................................. 358/811; 388/903; 388/915; 361/31; 318/258
[58] Field of Search .................................. 361/30-31, 361/45, 90-92; 318/254, 138, 255-259; 308/798-805; 388/804, 806, 811-815, 915, 903

[56] References Cited

U.S. PATENT DOCUMENTS

| | | | |
|---|---|---|---|
| 3,569,809 | 3/1971 | Comer | 388/811 |
| 3,624,475 | 11/1971 | Smith | 388/811 |
| 3,630,304 | 12/1971 | Sahinkaya | 388/811 |
| 3,883,786 | 5/1975 | McNaughton et al. | 388/811 |
| 3,911,343 | 10/1975 | Oster | 388/847 |
| 3,996,506 | 1/1975 | Kichak | 361/92 |
| 4,008,423 | 2/1977 | Christianson et al. | 388/801 X |
| 4,024,457 | 5/1977 | Riddle | 361/6 |
| 4,319,177 | 3/1982 | Kawada et al. | 318/798 |
| 4,345,289 | 8/1982 | Howell | 361/45 |
| 4,381,479 | 4/1983 | Wesling et al. | 388/811 |
| 4,500,820 | 2/1985 | Noto et al. | 318/139 X |
| 4,549,119 | 10/1985 | Slagle | 388/815 X |
| 4,577,164 | 3/1986 | Grib | 318/128 |
| 4,580,083 | 4/1986 | Omae et al. | 318/139 |
| 4,622,500 | 11/1986 | Budelmay, Jr. | 318/811 |
| 4,625,158 | 11/1986 | Taenzer | 318/811 |
| 4,821,136 | 4/1986 | Murari et al. | 361/91 |
| 4,851,743 | 7/1989 | Schmerda | 388/811 |
| 4,958,380 | 9/1990 | Scuccato et al. | 388/806 |

Primary Examiner—William M. Shoop, Jr.
Assistant Examiner—David Martin
Attorney, Agent, or Firm—John H. Crozier

[57] ABSTRACT

In a preferred embodiment, a high-frequency, pulse-width-modulated, power-transistor, DC motor speed controller having current limiting in both drive and regenerative modes, essentially constant ramping rates regardless of whether or not the operator switches to neutral before changing direction, a simple sequencer which controls the timing of four functions—both drive and regenerative current measuring circuits and both drive and regenerative transistors, a highly effective transistor filter capacitor arrangement, and circuitry in which the level of regenerative current is used as an input to control the current under which the direction relays switch.

15 Claims, 15 Drawing Sheets

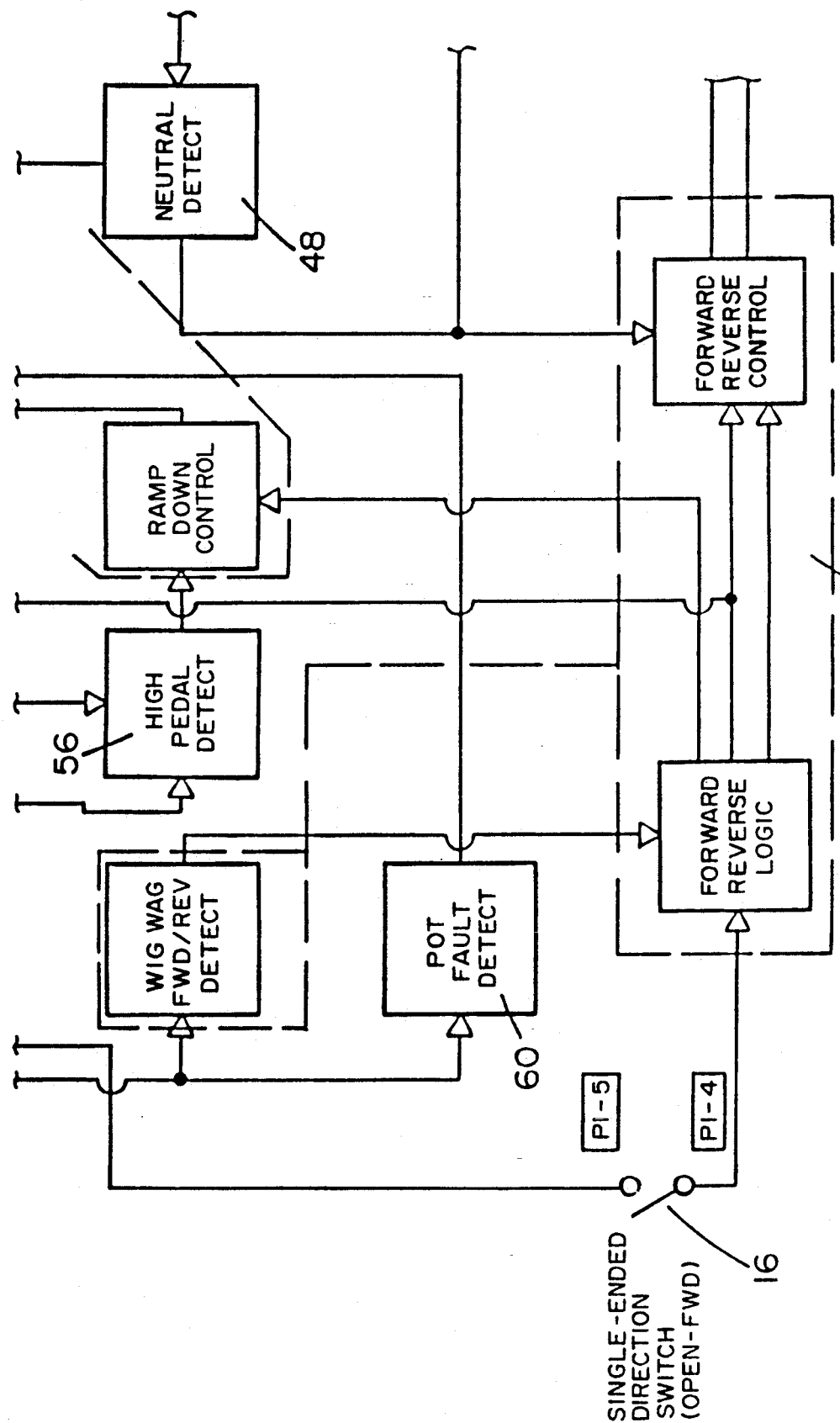
FIG. I(b)

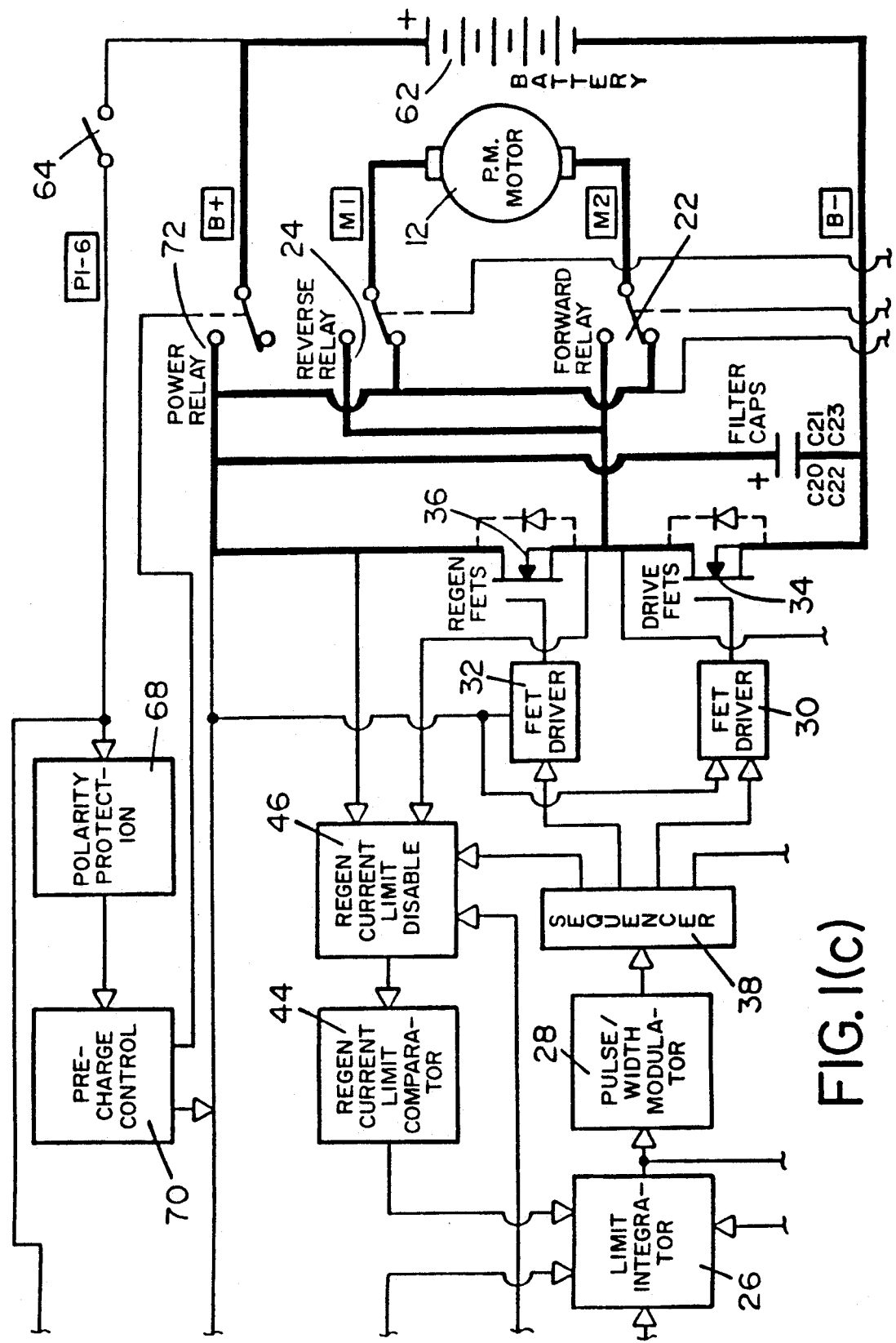

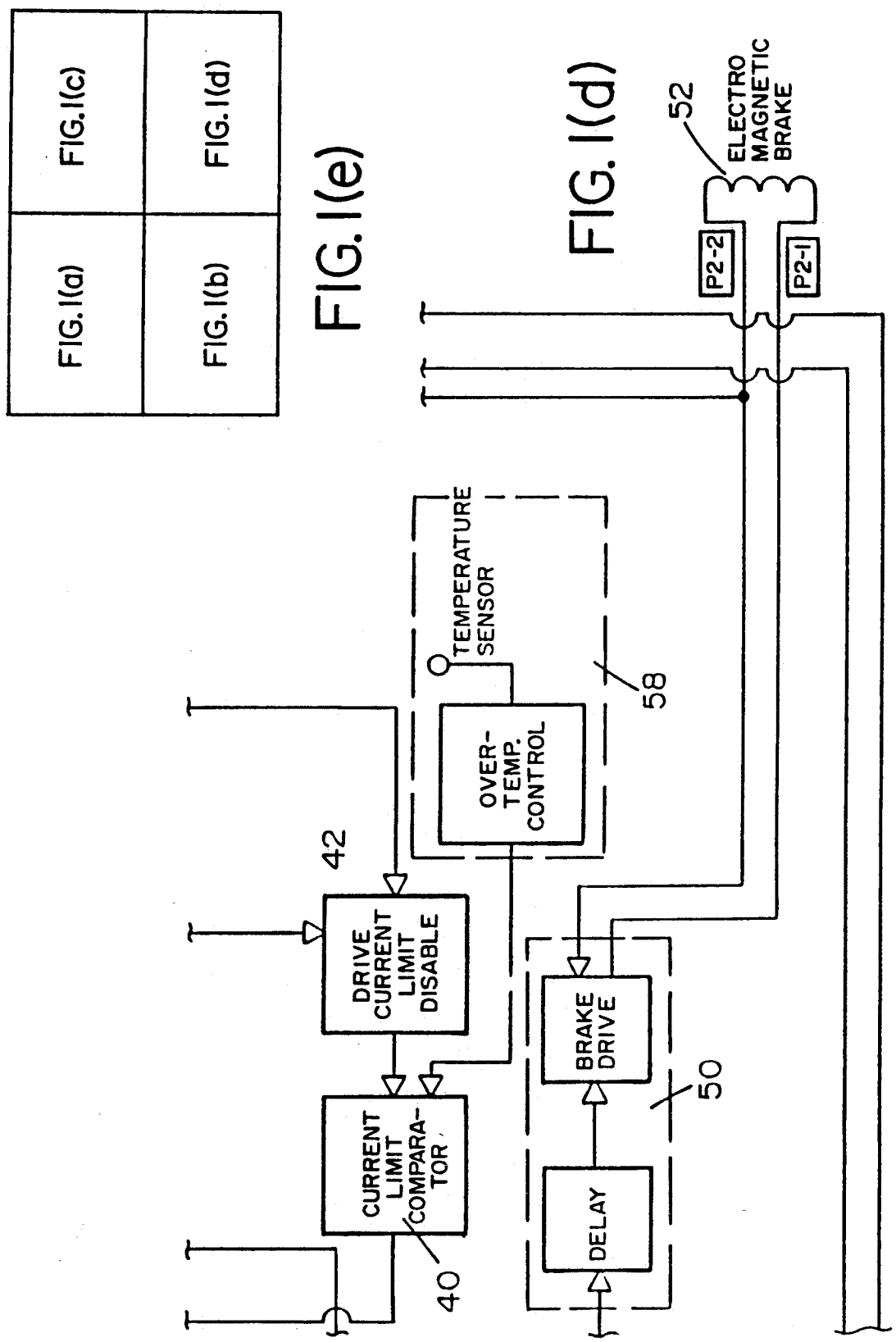

METHOD AND APPARATUS FOR DC MOTOR SPEED CONTROL

BACKGROUND OF THE INVENTION

1. Field of the Invention

The present invention relates to DC motor speed and direction controllers generally and, more particularly, to a novel motor speed controller for permanent magnet DC motor applications.

2. Background Art

Motors for which the speed controller of the present invention are particularly suited are typically heavy-duty 12-volt, 24-volt, and 36-volt permanent magnet DC motors such as are used to drive small vehicles, wheelchairs, sweepers, conveyor belts, and power steering units, for example.

Known speed and direction controllers for such motors are typically relatively large and complex and, consequently, relatively expensive. In particular, such known controllers usually employ large switching relays, since means are generally not included to limit the currents which the relays switch. Other disadvantages of such known controllers are that they do not permit current limiting in both drive and regenerative modes and ramping rates may vary depending on how the operator of the equipment changes throttle control direction. In addition, many such known controllers have inadequate filtering of the switched currents in the drive transistors. Further, circuitry to assure that both drive and regenerative transistors are not on at the same time and to disable current limiting functions near the time the transistors are switched on or off is unnecessarily complicated.

Accordingly, it is a principal object of the present invention to provide a method and means by which the sequencing of transistor switching and current limit circuit disabling in a DC motor controller is simply and economically accomplished.

Another object of the invention is to provide a method and means by which current may be limited in both drive and regenerative modes of a DC motor controller.

An additional object of the invention is to provide a method and means by which a DC motor controller may provide ramping rates which are independent of how the equipment operator moves the throttle when changing direction.

Yet another object of the invention is to provide a method and means by which the currents switched by the relays in a DC motor controller are limited during switching.

Yet an additional object of the invention is to provide an improved arrangement of filter capacitors in a DC motor controller.

Other objects of the invention, as well as particular features and advantages thereof, will be, apparent from the following description and the accompanying drawing figures.

SUMMARY OF THE INVENTION

The present invention accomplishes the above objects, among others, by providing, in a preferred embodiment, a high-frequency, pulse-width-modulated, power-FET, DC motor speed controller having current limiting in both drive and regenerative modes, essentially constant ramping rates regardless of whether or not the operator switches to neutral before changing direction, a simple sequencer which controls the timing of four functions—both drive and regenerative current measuring circuits and both drive and regenerative FETS, a highly effective filter capacitor arrangement, and circuitry in which the level of regenerative current is used as an input to control the current under which the direction relays switch.

BRIEF DESCRIPTION OF THE DRAWING

FIGS. 1(a)–1(d) comprise a block diagram of a DC motor controller according to the present invention.

FIG. 1(e) illustrates the arrangement of the sheets containing FIGS. 1(a)–1(d) when joined.

DETAILED DESCRIPTION OF THE PREFERRED EMBODIMENTS

Figure 1A:
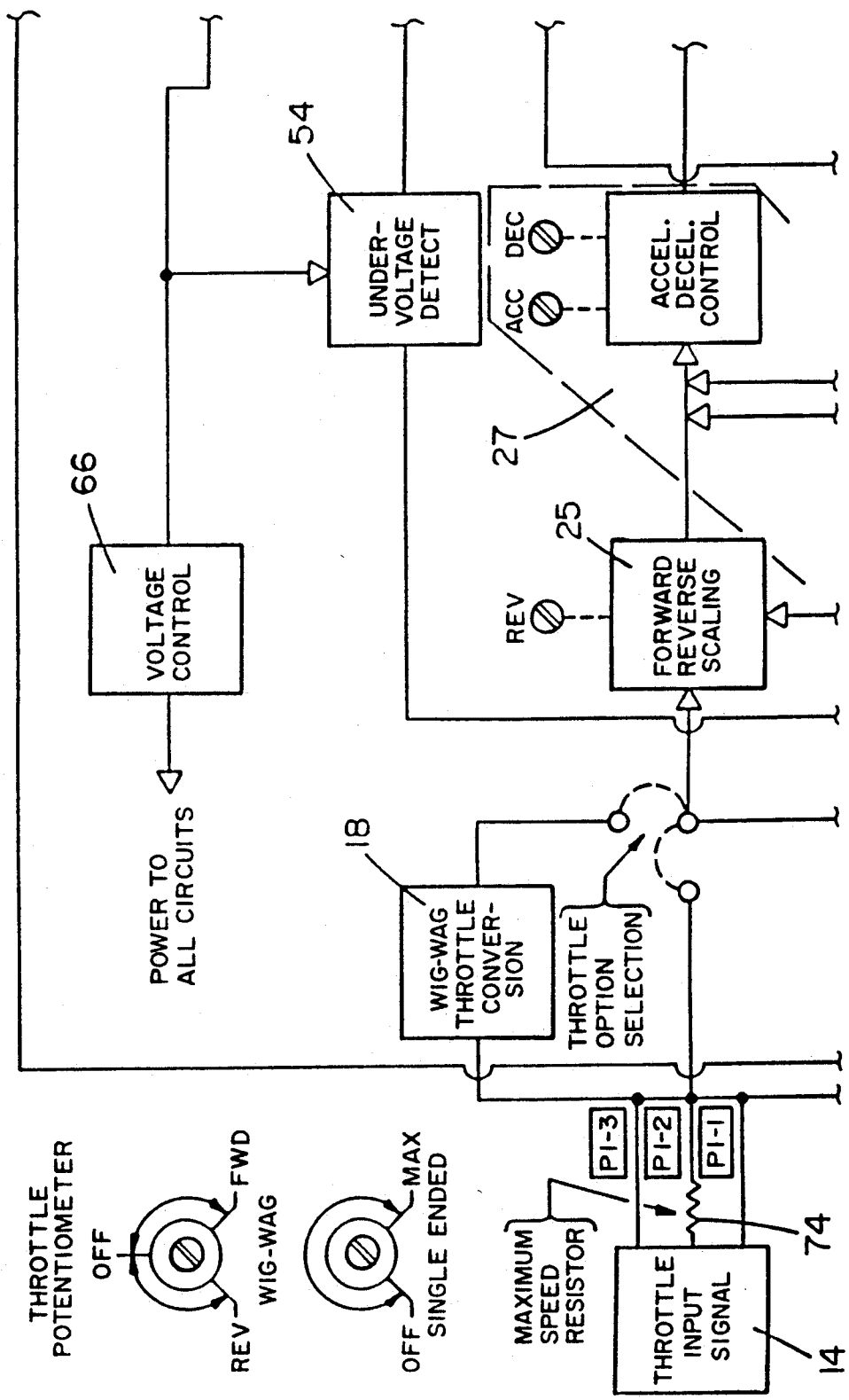
Figure 2A:
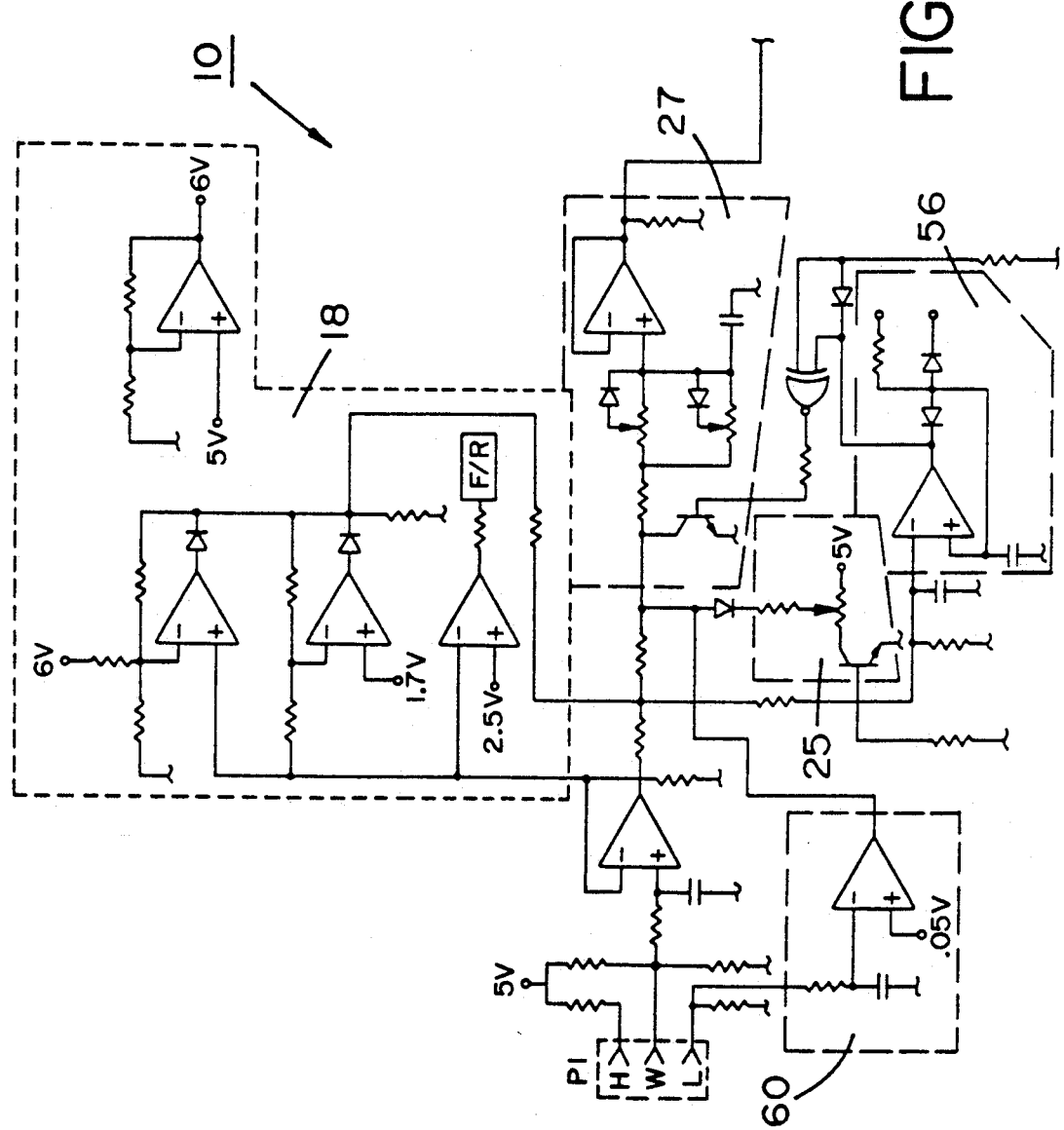
FIGS. 2(a)–2(f) comprise a schematic diagram of the DC motor controller of FIGS. 1(a)–1(d).
Figure 2B:
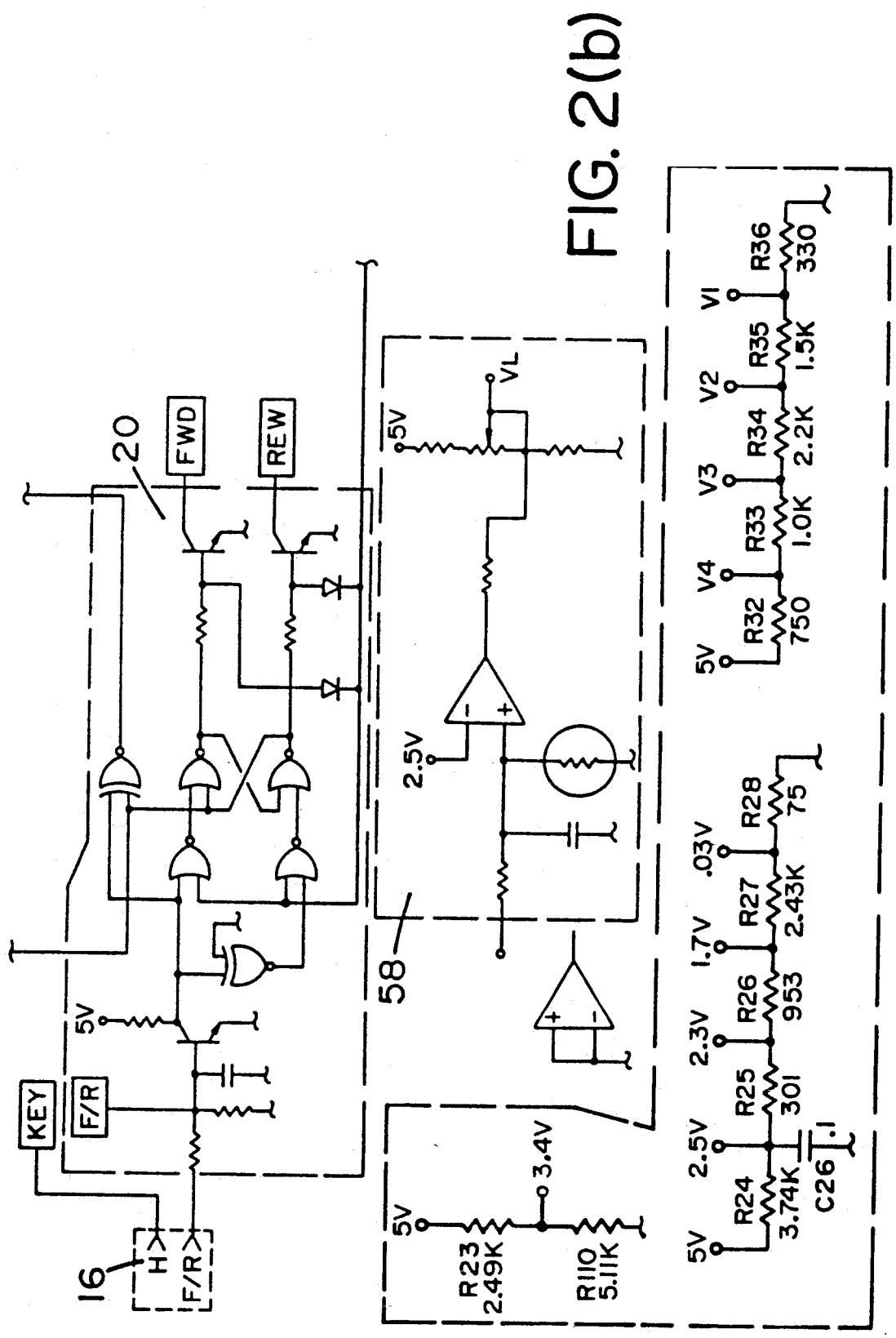
Figure 2C:
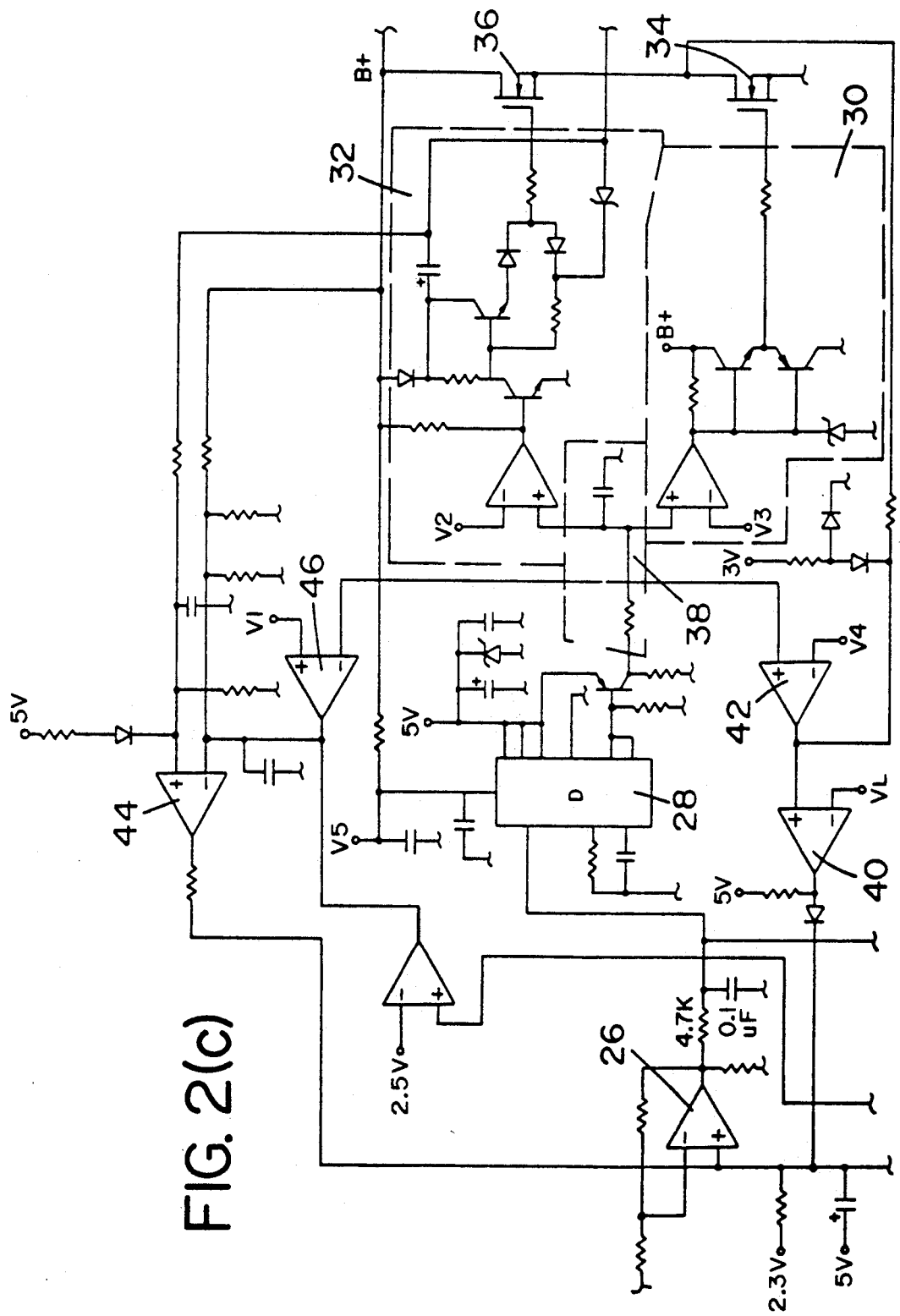
Figure 2D:
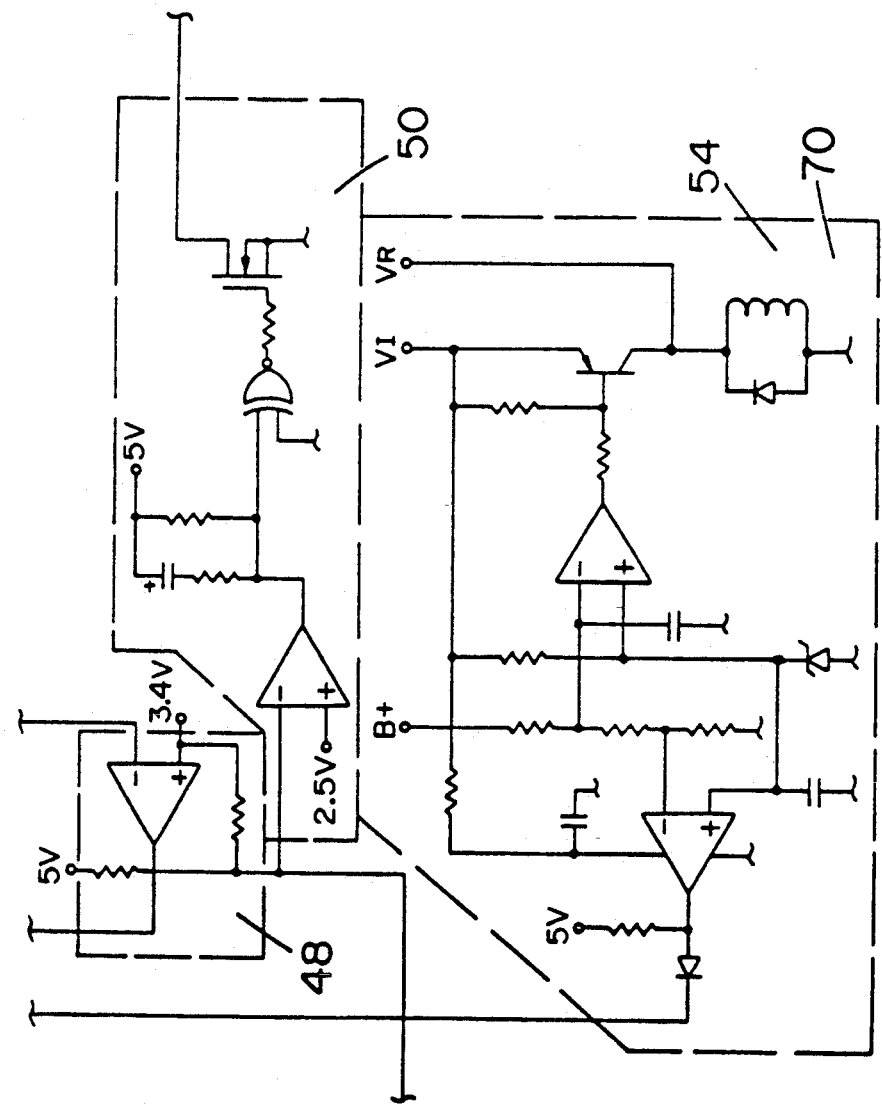
Figure 2E:
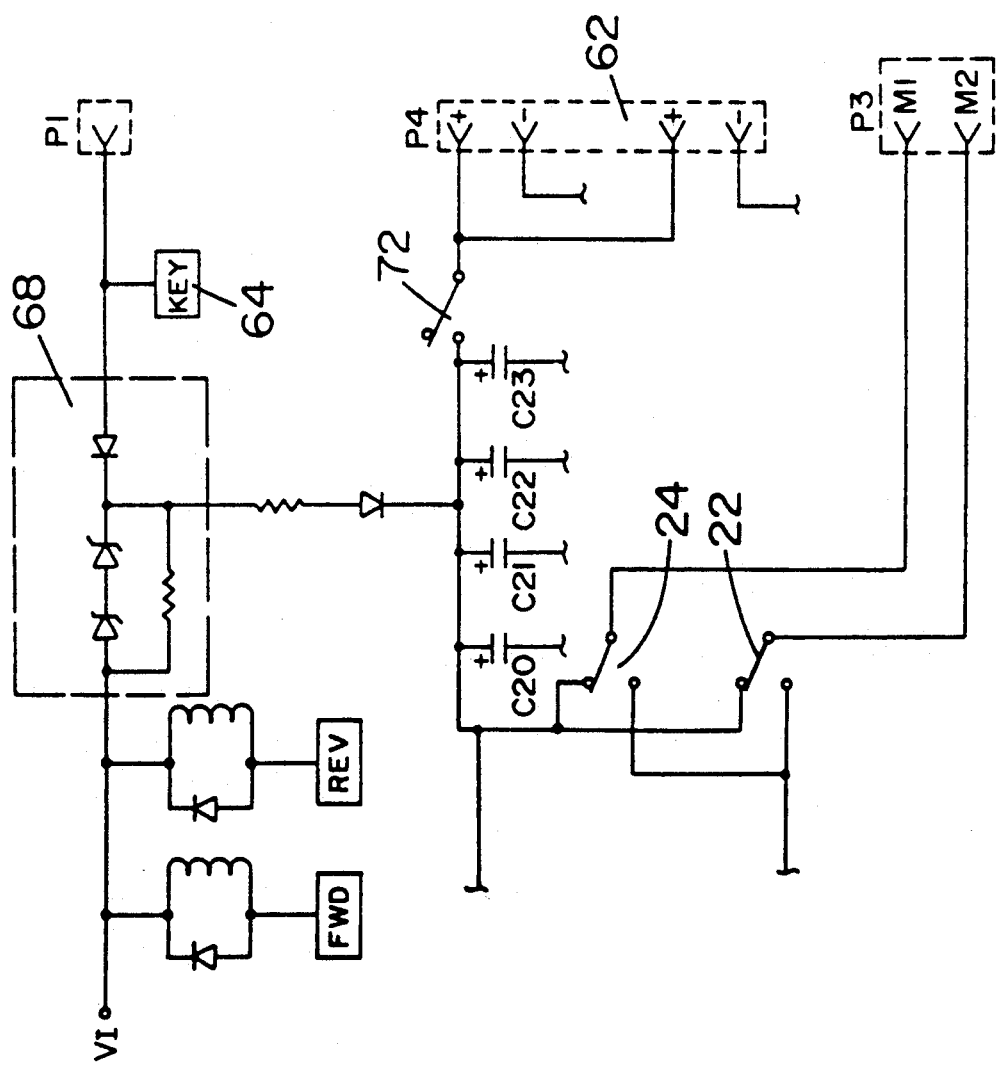
Figures 2F, 2G:
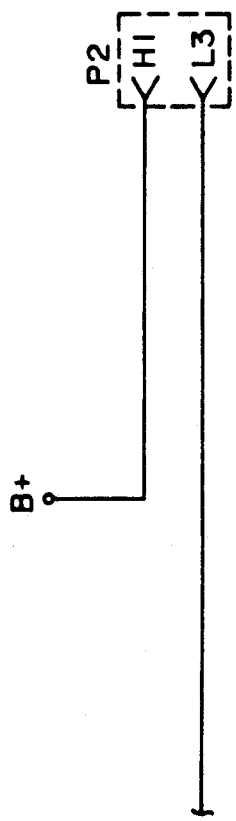
FIG. 2(g) illustrates the arrangement of the sheets containing FIGS. 2(a)–2(f) when joined.

Referring now to the Drawing, FIG. 1 is a block diagram, and FIG. 2 is a schematic diagram, of the DC motor speed controller of the present invention, generally indicated by the reference numeral 10, connected to control the speed and direction of a motor 12. Like or similar elements are indicated by consistent identifying numerals on FIGS. 1 and 2.

Throttle input signals may be supplied to controller 10 by means of a single-ended potentiometer 14 (with full off being at one end of rotation and full on at the other end) together with a separate direction switch 16, or by means of a wig-wag throttle 18 having a center-off position (with full forward and full reverse being at opposite ends of the wig-wag potentiometer).

Forward/reverse control circuitry 20 energizes and deenergizes forward and reverse relays 22 and 24, respectively. Forward/reverse scaling circuit 25 and acceleration/deceleration circuit 27 provide, respectively, trimpots for adjusting reverse speed range and acceleration/deceleration ramp rates by adjusting, or limiting, the level of the input control signal. The control signal passes to a limit integrator 26, the function of which is described below, and then to a pulse-width modulator 28 which controls the level of current to drive and regenerative FET drivers 30 and 32, respectively, which, in turn, control drive and regenerative FETs 34 and 36, respectively. It will be understood that, although single FETs are shown on FIGS. 1 and 2, any number may be employed depending on the rating of the FETs and the controller, generally, and, for the present embodiment illustrated, four FETs each would be provided for the drive and regenerative power outputs. Additionally, as noted on FIG. 2, certain components would be selected depending on controller rating, and such selection would be well within the knowledge of one skilled in the art.

A sequencer 38 is disposed between pulse-width modulator 28 and FET drivers 30 and 32, the function of which sequencer will be described below.

A drive current limit comparator 40 is connected to sense the voltage drop across drive FET 34 and to provide an input to limit integrator 26 representative of the current flowing through the drive FET. A drive current limit disable 42 is connected to provide an input signal to drive current limit comparator 40 to terminate drive current. Likewise, on the regenerative side of controller 10, there is provided a regenerative current limit comparator 44 and a regenerative current limit disable 46 having similar functions to the similar components on the drive side of the controller. A neutral detect circuit 48 is connected to provide an input to forward/reverse circuitry 20 to assure that relays 22 and 24 are switched only when controller 10 is in the neutral state. Brake drive circuitry 50 is connected to the output of neutral detect circuit 48, which circuitry may be used to control an electromagnetic brake 52.

Connected to limit, prevent, or terminate, respectively, the output of controller 10 are undervoltage detect circuit 54, high pedal detect circuit 56, and over-temperature control circuit 58 and pot fault detect circuit 60.

Controller 10 is connected to battery 62 which provides power for motor 12 and, through keyswitch 64, power to voltage control circuitry 66. Disposed in the line to voltage control circuitry 66 is a polarity protection circuit 68 and a precharge control circuit 70. Current from battery 62 to the power section of controller 10 is provided through the closing of power relay 72.

It will be understood from an inspection of FIG. 2 that similar circuitry provides the functions of both undervoltage detect circuit 54 and precharge control circuit 70.

The configuration of FETs 34 and 36 in a half bridge arrangement, together with relays 22 and 24, provides full four-quadrant motor operation—drive and regenerative braking in forward and reverse. True bidirectional speed control is achieved for all operating conditions. The current in motor 12 is always positively controlled, so that there is never a condition in which the motor can coast.

In operation, controller 10 is activated by the turning on of keyswitch 64. Polarity protection circuit 68 is provided so that a reversal of the connections to battery 62 will not allow the controller to be turned on. Filter capacitors C20, C21, C22, and C23 provide the instantaneous current pulses required by the pulse-width modulated outputs of FETs 34 and 36 and also prevent voltage spikes from disrupting the control or power circuitry.

Capacitors C20, C21, C22, and C23 would normally require a large current surge to charge them to the battery voltage; however, a precharge resistor R80 avoids this surge by slowly charging the capacitors at turn-on and only when the capacitors charge to about two-thirds nominal battery voltage does precharge circuit 70 allow power relay 72 to close. The resulting current flow is low and well controlled, thus resulting in maximum life of keyswitch 64 and relay 72.

If battery voltage is too low, circuit 54 will prevent the controller from turning on. Also, if FETs 34 or 36, sequencer 38, or FET drivers 30 or 32 have failed in a shorted condition, controller 10 will not turn on because the voltage of capacitors C20, C21, C22, and C23 cannot rise far enough to allow the precharge circuit to turn on power relay 72. Turning off keyswitch 64 immediately removes all power from controller 10 and brakes motor 12 to a stop through normally closed contacts of relays 22 and 24.

During normal operation of motor 12, say, for example, vehicle ground level operation, hill climbing or acceleration, motor current passes through drive FET 34 when it is on and through the internal diode (FIG. 1) of regenerative FET 36 when both FETs 34 and 36 are off during dead times of sequencer 38. When FET 36 is on, its internal diode is shunted by the FET turn on, thus further reducing voltage drop and power dissipation across the device which is being used as a free-wheel diode. During deceleration and downhill operation (regenerative braking), motor current passes through regenerative FET 36 when it is on and through the internal diode (FIG. 1) of drive FET 34 during the dead times. When drive FET 34 turns on, the latter diode drop is reduced by the FET turn on, thus making the free-wheel losses much smaller. In regenerative braking mode, currents built up in motor 12 (to cause braking) are fed back to battery 62. In neutral mode, relays 22 and 24 are returned to their neutral positions and motor 12 is dynamically braked by the shorted relay contacts. Motor speed is adjusted by varying the duty cycle of the power FET half-bridge output stage according to the throttle control input signal.

Duty cycle control for pulse-width modulator 28 is derived from two possible sources, either single-ended throttle 14 or wig-way throttle 18. Maximum speed in either case may be externally limited by the use of series resistor 74 (FIG. 1) of a selected value, which restricts the input voltage swings, resulting in a limited duty cycle for both forward and reverse operation.

Problems caused by a broken throttle potentiometer, wiper element, or wires are eliminated by potentiometer fault detection circuit 60. If any of these conditions occur, controller 10 returns to neutral throttle (zero duty cycle).

Forward and reverse direction for single-ended throttle 14 is determined by external direction switch 16, with the switch open position being forward and the switch closed position being reverse. If either of the switch wires breaks, the controller 10 will default to forward operation. Neutral throttle is 200 ohms or less for a 5K-ohm potentiometer or 0.3 V or less for the voltage input. Full throttle is 4.8K ohms for potentiometer input or 4.7 V for voltage input.

Forward or reverse detect for wig-wag throttle 18 is determined by sensing the level of the throttle input signal. Neutral throttle is center-off for a 5K-ohm potentiometer or 2.5 V for the voltage input. A $(+/-)$ 0.3 V neutral dead band allows adequate tolerance for accommodating variations in centering of the throttle potentiometer. Throttle inputs greater than 2.8 V select forward operation and forward relay 22. Inputs less than 2.2 V select reverse operation and reverse relay 24.

Forward/reverse circuitry 20 controls dual ramp automatic reversing to provide smooth speed transitions when rapidly changing vehicle direction (for slow direction changes, the duty cycle will follow the throttle input signal unless any current limit conditions occur, as described below). Forward reverse circuitry 20 determines if the controller direction needs to be changed by comparing the direction input signal with the direction controller 10 is presently operating. If these two signals agree, no action is taken and the controller continues to operate normally in the present direction. When these inputs disagree, forward reverse circuitry 20 causes acceleration/deceleration circuitry 27 to smoothly pull the throttle signal toward neutral through the deceleration time constant. If throttle is still applied when controller 10 reaches neutral, acceleration/deceleration circuitry 27 will then allow the throttle signal to smoothly increase to the speed determined by the throttle input through the acceleration time constant. This dual ramp reversing may be delayed if drive or regenerative current limiting occurs during deceleration or acceleration, respectively.

Operation of the ramping functions can be further understood with reference to FIG. 2. Assume that the operator of the equipment has the throttle in full forward so that transistor Q3 in forward/reverse circuitry 20 is energized to put relay 22 in the forward position. Then, the operator puts the throttle in full reverse. This provides a reverse signal to exclusive OR gate H(456) which changes the input to exclusive OR gate H(123) the output of which overrides the input throttle signal by clamping transistor Q1 of acceleration/deceleration control circuit 27 to ground. The control signal then ramps down at a rate depending on the time constant determined by resistors R9 and R96 and capacitor C2 in acceleration/deceleration control circuit 27. When the neutral state is reached, the signal from exclusive OR gate H(123) drops and transistor Q1 switches off. The positions of relays 22 and 24 reverse and acceleration in the opposite direction begins by the control signal ramping up at a rate depending on the time constant determined by resistors R8 and R96 and capacitor C2 in acceleration/deceleration control circuit 27. Thus, deceleration and acceleration occurs exactly as it would have as if the operator had shifted to neutral for deceleration and then to full reverse for acceleration.

If rapid vehicle deceleration creates excessive regenerative motor currents, then regenerative current limit comparator 44 will operate to not allow the duty cycle to decrease to neutral until the vehicle has slowed enough to reduce regenerative current below the limit level (typically 45A for the embodiment shown). Once controller 10 is out of regenerative current limit, the duty cycle can decrease to zero as the controller goes into neutral. Then, if throttle is still applied, the duty cycle will begin increasing. If excessive motor currents occur during acceleration, drive current limit comparator 40 will operate to keep the duty cycle from increasing until the over-current condition is removed.

Neutral detect circuit 48 compares the control signal from limit integrator 26 to a reference voltage to determine if the controller is in neutral and, only at that point, does the neutral detect circuit permit forward/reverse circuitry 20 to switch relays 22 and 24. The level of the regenerative current is tied into neutral detect circuit 48 through limit integrator 26. Regenerative current exceeding the limit level will cause limit integrator to produce an output signal which neutral detect circuit 48 recognizes as other than a neutral signal and the neutral detect circuit provides an output which prevents the flip flop in forward/reverse circuitry 20 from switching. Tying the regenerative current level into the relay switching function assures that reasonable levels of current will be switched and, therefore, smaller and more economical relays may be employed.

Abrupt vehicle starting problems are eliminated by high-pedal detect circuit 56 which determines if the throttle is depressed (on) when keyswitch 64 is turned on. If this condition occurs, controller 10 will be forced to remain in neutral until the throttle is reduced to a low level. Controller 10 will then operate normally and high-pedal detect circuit 56 will not be activated again until keyswitch 64 is turned off and back on again.

Normally, forward speed range is from 0 to 100% (zero to maximum speed) and reverse speed range is from zero to a nominal 60%. Reverse speed scaling may be set in the range of about 40-100% duty cycle (percent of maximum speed) by adjusting the reverse speed potentiometer R97 in forward/reverse scaling circuit 25.

Vehicle acceleration and deceleration rates may be independently set and may be symmetrical or asymmetrical as determined by the settings of potentiometers R8 and R9 in acceleration/deceleration circuitry 27. These potentiometers set RC time constants which limit the rate of change of the throttle control input signal, or ramp rate.

After acceleration/deceleration circuitry 27, the throttle control signal passes through limit integrator 26 which: (1) scales the control signal for pulse-width modulator 28, (2) reduces controller output duty cycle in response to motor drive over-current or battery undervoltage conditions, and (3) increases duty cycle in response to motor regenerative over-current condition. The resulting conditioned throttle input signal from limit integrator 26, then, directly determines the output duty cycle of FETs 34 and 36 via pulse-width modulator 28, sequencer 38, and drivers 30 and 32.

Integrated circuit pulse-width modulator 28 converts the conditioned throttle input signal into a smoothly varying fixed frequency duty cycle control signal for the power output stage. This variable duty cycle signal is modified by sequencer 38 to properly drive FETs 34 and 36 and the drive and regenerative current limit disablers 42 and 46.

Sequencer 38 provides interlaced drive waveforms from pulse-width modulator 28 to assure that both drive FET 34 and regenerative FET 36 are never turned on at the same time by inserting a dead time (all FETs off) between when the drive FET turns off and the regenerative FET turns on and vice versa. Drivers 30 and 32 amplify and level shift the waveforms from sequencer 38 to the appropriate levels to drive FETs 34 and 36.

Anytime that a FET is turned on, a certain time must be allowed for the FET to fully turn on and for transients to settle out before looking at it to see if an overcurrent condition is present. Likewise, when the FET is turned off, its overcurrent circuit must be disabled before the FET is turned off. It is also necessary to ensure that both regenerative and drive FETs are not turned on simultaneously. The operation of sequencer to achieve these results may be further understood by reference to FIG. 3 which is described immediately below. The use of such a sequencer for turning FETs on and off is known, but the present invention employs a sequencer to control the timing of four functions.

Figure 3:
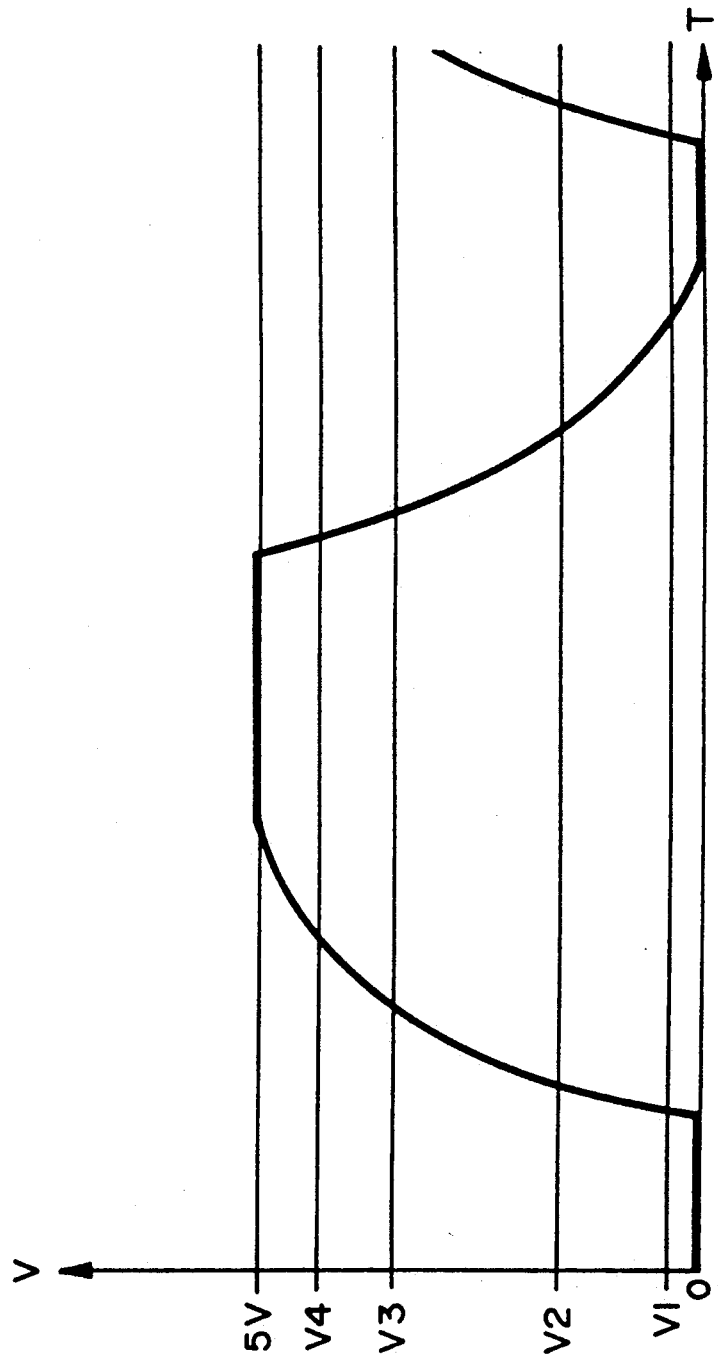
FIG. 3 is a voltage-versus-time graph illustrating the operation of the sequencer of the present invention.

Series connected resistor R46 and capacitor C12 comprise sequencer 38, with the curve of FIG. 3 showing the charging and discharging of the capacitor between 0 and 5 volts. The horizontal lines labeled V1, V2, V3, and V4 are the reference voltages to regenerative current disable 46, regenerative FET driver 32, drive FET driver 30, and drive current limit disable 42, respectively (FIG. 2). Beginning at the left edge of the curve on FIG. 3, and assuming that regenerative FET 36 is on (pulse-width modulator 28 is in its high state), regenerative FET current limit disable 46 is allowing the current across that FET to be measured by regenerative current limit comparator 44, and voltage at capacitor C12 is zero. When the point on the curve is reached where pulse-with modulator 28 switches on, capacitor C12 starts charging. When the voltage at capacitor C12 has exceeded V1, regenerative current limit disable activates and the regenerative current limit comparator 44 is cut out. The difference between V1 and V2 in terms of time is short because of the steepness of that portion of the curve and the narrow difference between the reference voltages, but the difference is long enough to ensure that there is indeed a gap in time between disabling regenerative current limit comparator 44 and the turning off of regenerative FET 36. When V2 is exceeded, regenerative FET driver 32 turns off regenerative FET 36.

Desirably, there is a reasonable displacement in time between V2 and V3 on the curve to ensure that regenerative FET 36 has had time to fully turn off. When V3 is exceeded, drive FET driver 30 causes drive FET 34 to turn on. The displacement in time between V3 and V4 permits drive FET 34 to stabilize and when V4 is exceeded, the drive current limit disable is deactivated and the current through drive FET 34 is sensed by drive current limit comparator 40. After capacitor C12 is fully charged to 5 volts, pulse-width modulator 28 continues to have a high output for on the order of up to 66 microseconds as indicated by the rail at the top of the curve. At the end of the rail, pulse-width modulator 28 switches off, its output goes to ground, and capacitor C12 begins to discharge.

The functions initiated by the discharge of capacitor C12 are reciprocals of the those on the charging portion of the curve. When the voltage drops below V4, drive current limit disable 42 is activated so that the current limit signal is not being measured by drive current limit comparator 40. The short time differential between V4 and V3 provides a gap between the turning on of drive current disable 42 and the turning off of drive FET 34 which is caused by the output of drive FET driver 30 when the voltage of capacitor C12 drops below V3. When the charge on capacitor C12 drops below V2 (V3-V2 on the discharging side of the curve being approximately equal to V2-V3 on the charge side of the curve), regenerative FET 36 is turned on. V2-V1 is a relatively long time increment and, when the voltage drops below V1, regenerative current limit disable 46 is deactivated so that regenerative current limit comparator 44 measures the current through regenerative FET 36. Voltage at capacitor C12 then decays to zero and remains there for on the order of up to 66 microseconds depending on controller and motor conditions, at the end of which period of time, pulse-width modulator 28 switches on and the above cycle is repeated. Charging and discharging times are typically on the order of about 6 microseconds each.

It can be seen that the normal shapes of the charging and discharging portions of the curve, together with the proper selection of the reference voltages, V1, V2, V3, and V4, provide the proper spacing in time of the sequencing of the four functions, simply and economically with a minimum number of components.

Referring again to FIGS. 1 and 2, motor drive current limiting is accomplished by sensing the voltage drop across drive FET 34 when that FET is turned on. Drive current limit comparator 40 compares this sensed voltage to a reference voltage which sets the controller current limit and, when this reference voltage is exceeded, the drive current limit comparator forces limit integrator 26 to reduce the controller output duty cycle to hold the output current at the limit level until the over-current condition is removed. When drive FET 34 is off, the current limit signal is not valid. During such times, drive current limit disable 42 keeps these false signals from drive current limit comparator 40.

Motor regenerative current limiting operates in the same fashion as drive current limiting. The voltage drop across regenerative FET 36 is sensed when the regenerative FET is on and is compared, by regenerative current limit comparator 44 with a reference voltage which sets the maximum regenerative current. When the reference level is exceeded, regenerative limit comparator 44 forces limit integrator 26 to increase the controller output duty cycle to keep the regenerative current absorbed by controller 10 at the limit level until the over-current condition is removed. When regenerative FET 36 is off, the current limit signal is disabled by regenerative current limit disable 46. This regenerative current limit feature allows the use of a relatively large, low-resistance motor without the problem of excessive regenerative currents causing harm to controller 10 or motor 12 while maintaining relatively large braking current (typically 45A for the embodiment shown).

Motor voltage polarity is determined as follows: When forward operation is selected, terminal M1 is connected to B+ via reverse relay 24 and terminal M2 is connected to the output of pulse-width modulator 28 via relay 22. As the throttle is increased, M2 is modulated with a larger percentage of the time towards B−. At full throttle, M2 is connected to B− 100% of the time so that full battery voltage is applied to motor 12. In reverse mode, the functions of terminals M1 and M2 are reversed, with M2 being connected to B+ while M1 is modulated. Maximum reverse duty cycle will be as set by trimpot R97 in forward/reverse scaling circuit 25.

Over-temperature control circuit 58 reduces controller output drive current limit in response to an over-temperature condition. This feature protects both motor 12 (inferentially) and controller 10 from excessive heating. Normal current output is returned once the temperature cools below the thermal cut-back temperature.

When the batteries discharge in normal operation to about two-thirds of nominal battery voltage, undervoltage detect circuit 54 forces limit integrator 26 to cut back motor current to maintain battery voltage at the cut-back voltage. This allows the vehicle to be operated on low batteries, with reduced performance, but will not allow the batteries to discharge when below this cut-back voltage. It will be understood that the battery voltage under consideration here is the "dynamic" battery voltage as opposed to the "static" battery voltage, that is, the cut-back voltage is the voltage across the battery when it is connected to a load and not merely the voltage that could be measured across the battery terminals in a no-load situation.

A spring set motor brake 52 may be operated by brake drive circuitry 50, which circuitry operates by detecting neutral throttle and by providing a unidirectional time delay to drive the brake. When increasing throttle from neutral to forward or reverse, the brake coil is immediately energized to allow the vehicle to operate. The delay operates when returning to neutral from forward or reverse. This delay allows time to go from forward to reverse, or vice versa, without brake 52 operating as the throttle passes through neutral. Typically, nominal brake delay is one second.

Figure 4:
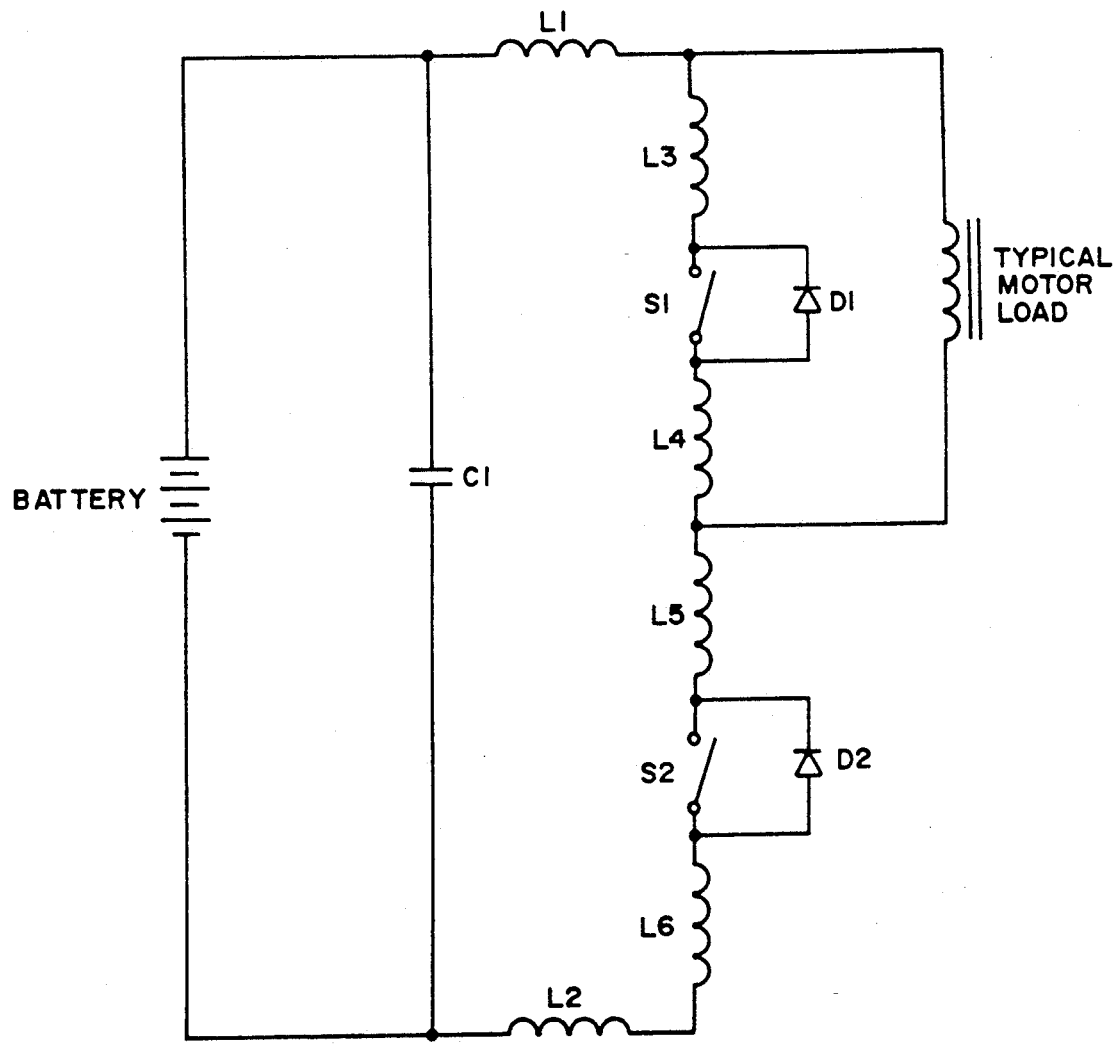
FIG. 4 is a schematic diagram showing parasitic layout-related inductances at the power output stage of a DC motor controller.

Referring now to FIGS. 4-7 will aid in understanding the preferred physical relationships between capacitors C20, C21, C22, and C23 and transistors 34 and 36 of FIGS. 1 and 2. FIG. 4 shows, schematically, the sources of parasitic layout-related inductances, indicated by L1-L6 in the power output stage of a DC motor controller. These stray inductances cause undesirable voltage spikes which can lead to controller malfunction and damage of electronic components. Such inductances on printed circuit boards are strongly influenced by physical location of components and by size and location of printed circuit board traces.

Figure 5:
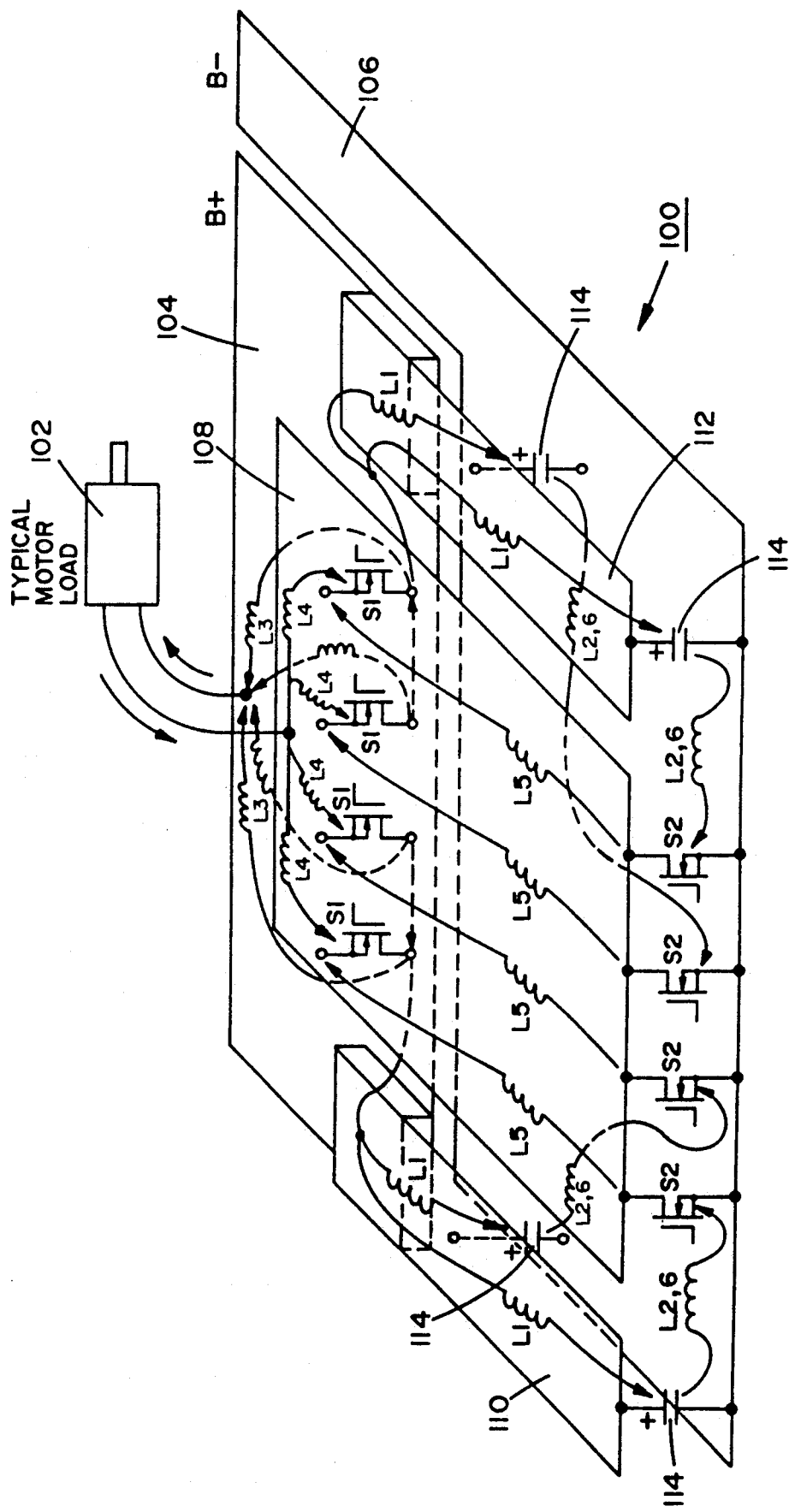
FIGS. 5 and 6 are perspective views of the power output stage of a DC motor controller showing the locations of transistors and of filter capacitors, according to the present invention.
Figure 6:
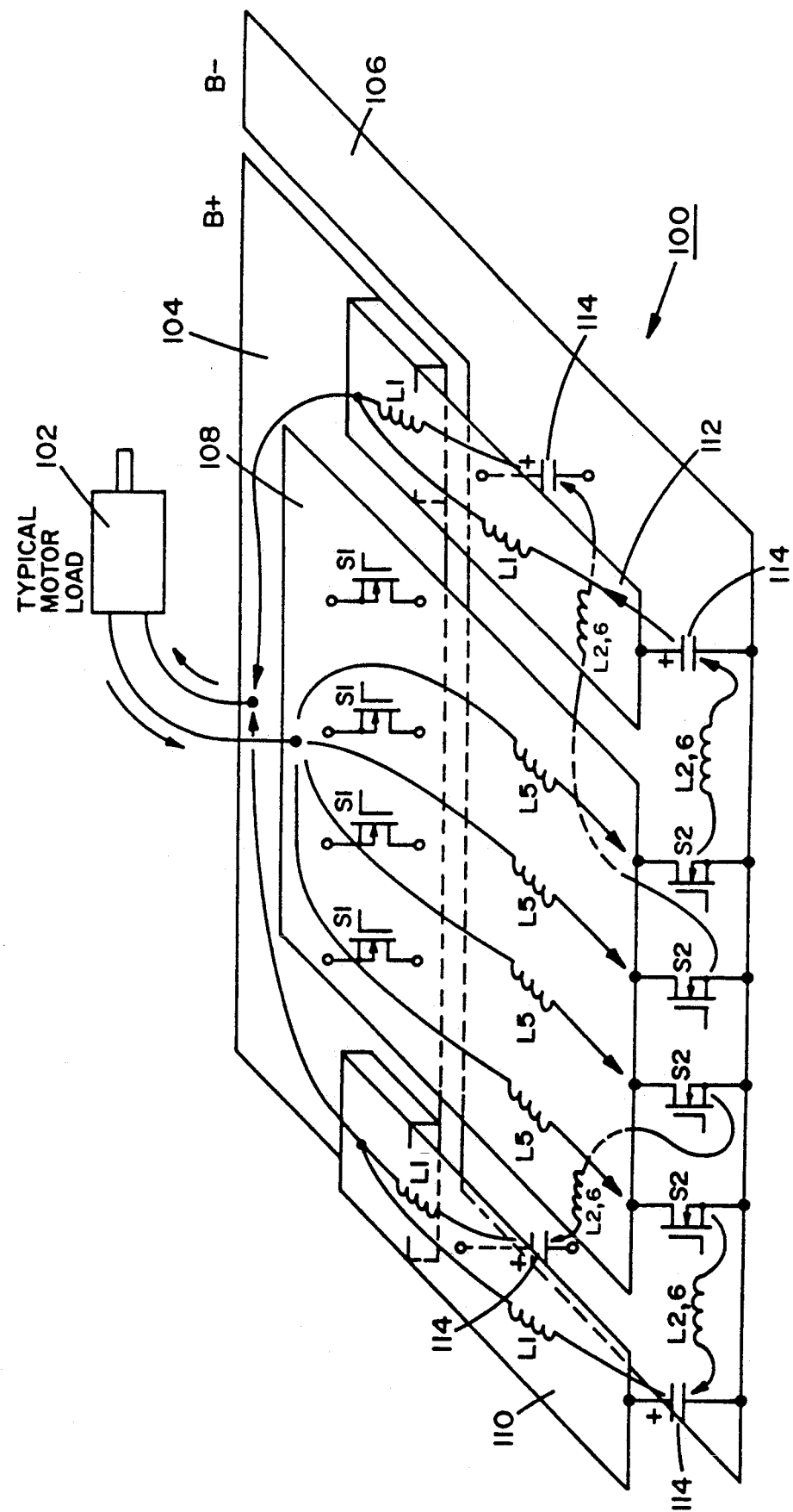
Figure 7:
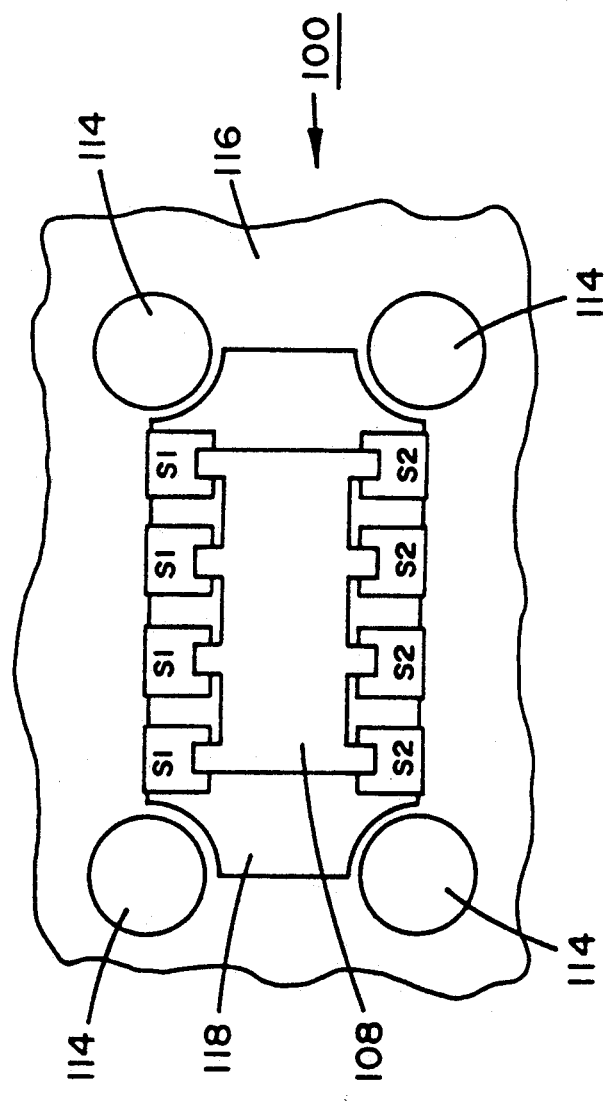
FIG. 7 is a fragmentary top plan view of a DC motor controller circuit board showing the locations of transistors and of filter capacitors, according to the present invention.

FIGS. 5-7 show the physical layout of the components of the power output stage of a DC motor controller constructed according to the present invention, generally indicated by the reference numeral 100, which is connected to drive a motor 102. Power output stage 100 includes B+ and B− conductive planes 104 and 106, respectively, a conductive plane 108 connecting switches S1 and S2, and conductive planes 110 and 112 extending between plane 102 and capacitors 114 which are connected between the latter two planes and plane 106. FIG. 7 is a fragmentary view of circuit board 116 with switches S1 and S2 mounted on a heat sink 118.

Indicated on FIG. 5 and 6 are representations of current paths for the discharge of inductances L1-L6, with FIG. 5 showing the direction of the inductive current flow when S1 switches are on and S2 switches are off and FIG. 6 showing the direction of the inductive current flow when S1 switches are off and S2 switches are on.

The positional interrelationships of the components as shown on FIGS. 5-7 minimizes stray inductances and causes these inductances to be coupled in the proper directions to further reduce the magnitude thereof. Generally, capacitors 114 are positioned to minimize the length of the discharge paths of the inductances, as nearly as they can be considering physical limitations.

It will be understood that the inductance discharge paths shown on FIGS. 5 and 6 are only representations of the directions of the major discharge paths, the actual discharge paths being diffuse.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A DC motor controller having drive and regenerative modes, comprising:
   (a) input means to receive an input control signal;
   (b) control means, responsive to said input control signal, to provide output driver signals to a drive transistor in said drive mode and to a regenerative transistor in said regenerative mode, and to absorb regenerative current in said regenerative mode;
   (c) current limiting means, connected to said control means, to provide regenerative current limiting in said regenerative mode by maximizing said regenerative current absorbed by said control means
   wherein said control means includes:
   (d) pulse-width modulator means connected to provide an input signal to said drive and regenerative transistors; and
   (e) limit integrator means connected to receive said input control signal and to provide an output signal to said pulse-width modulator means to adjust the duty cycle of said pulse-width modulator means;
   and wherein said current limiting means includes:
   (f) current measuring means to sense the current flowing through said regenerative transistor and provide an input signal to said limit integrator means when a selected level of said regenerative current is reached, to cause said limit integrator means to increase the duty cycle of said pulse-width modulator.

2. A method of controlling a DC motor having drive and regenerative modes, comprising the steps of:
   (a) receiving an input control signal;
   (b) providing output driver signals, responsive to said input control signal, to a drive transistor in said drive mode and to a regenerative transistor in said regenerative mode;
   (c) absorbing regenerative current in said regenerative mode;
   (d) providing current limiting in said regenerative mode by maximizing the absorption of said regenerative current in said regenerative mode
   wherein said step of providing output driver signals includes the steps of:
   (e) providing pulse-width modulator means connected to provide an input signal to control said driver signals; and
   (f) providing limit integrator means connected to receive said control signal and to provide an output signal to said pulse-width modulator means to adjust the duty cycle of said pulse-width modulator means;
   and wherein said step of providing regenerative current limiting includes:
   (g) sensing the current flowing through said regenerative transistor and providing an input signal to said limit integrator means when a selected level of said regenerative current is reached, to cause said limit integrator means to increase the duty cycle of said pulse-width modulator means.

3. A DC motor controller, comprising:
   (a) input means to accept an input control signal representative of desired motor speed and direction;
   (b) output means, responsive to said input control signal, to provide output power signals to drive said motor at said desired speed and direction;
   (c) control means connected to said output means to control the level of said output power signals; and
   (d) ramping means connected between said input means and said control means to provide automatic acceleration and deceleration ramping of said input control signal when said input control signal indicates a change in desired motor direction, said ramping means including means to decelerate said input signal to said control means until said motor reaches a neutral state and means to accelerate said input signal to said control means when said motor reaches said neutral state and until said motor reaches the speed indicated by said input control signal.

4. A DC motor controller, as defined in claim 3, wherein said ramping means further includes:
 (e) means to interrupt said input control signal to said ramping means until said motor reaches a neutral state and to reinstate said input control signal when said motor reaches said neutral state.

5. A method of controlling a DC motor, comprising the steps of:
 (a) receiving an input control signal representative of desired motor speed and direction;
 (b) providing output power signals, responsive to said input control signal, to drive said motor at said desired speed and direction;
 (c) controlling the level of said output power signals;
 (d) providing automatic acceleration and deceleration ramping of said input control signal when said input control signal indicates a change in desired motor direction and providing an input signal to control the level of said output power signals, including decelerating said input signal until said motor reaches a neutral state and accelerating said input signal to said control means when said motor reaches said neutral state and until said motor reaches the speed indicated by said input control signal.

6. A method of controlling a DC motor, as defined in claim 5, wherein said step of providing automatic acceleration and deceleration ramping further comprises:
 (e) interrupting said input control signal until said motor reaches a neutral state and reinstating said input control signal when said motor reaches said neutral state.

7. A method of selectively sequencing operation of drive and regenerative transistors and drive and regenerative current measuring means in a DC motor controller, beginning at a selected first point in time when said regenerative transistor and said regenerative current measuring means are on and said drive transistor and said drive current measuring means are off, comprising, in sequence, the steps of:
 (a) disabling said regenerative current measuring means at a succeeding selected second point in time, following said first point in time;
 (b) turning off said regenerative transistor at a succeeding selected third point in time following said second point in time;
 (c) turning on said drive transistor at a succeeding selected fourth point in time following said third point in time;
 (d) turning on said drive current measuring means at a selected succeeding fifth point in time following said fourth point in time;
 (e) turning off said drive current measuring means at a succeeding selected sixth point in time following said fifth point in time;
 (f) turning off said drive transistor at a selected selected seventh point in time following said sixth point in time;
 (g) turning on said regenerative transistor at a succeeding selected eighth point in time following said seventh point in time; and
 (h) turning on said regenerative current measuring means at a succeeding selected ninth point in time following said eighth point in time.

8. A method of selectively sequencing operation of drive and regenerative transistors and drive and regenerative current measuring means, as defined in claim 7, wherein:
 (i) step (a) occurs when a selected first reference voltage level is exceeded;
 (j) step (b) occurs when a selected second reference voltage level is exceeded;
 (k) step (c) occurs when a selected third reference voltage level is exceeded;
 (l) step (d) occurs when a selected fourth reference voltage level is exceeded:
 (m) step (e) occurs when said selected fourth reference voltage level is fallen below;
 (n) step (f) occurs when said selected third reference voltage level is fallen below;
 (o) step (g) occurs when said selected second reference voltage level is fallen below; and
 (p) step (h) occurs when said selected first reference voltage level is fallen below.

9. A DC motor controller, comprising:
 (a) input means to receive an input direction control signal;
 (b) driver means, responsive to said input direction control signal, to provide output driver signals to a drive transistor in a drive mode and to a regenerative transistor in a regenerative mode;
 (c) relay means connected to said transistors to reverse the current flow from said transistors to said motor;
 (d) forward/reverse circuitry means connected to said relay means to switch said relay means depending on said input direction control signal;
 (e) measuring means connected to said regenerative transistor to measure the level of current flow therethrough and to provide a signal representative of said level of current; and
 (f) limit means connected between said measuring means and said forward/reverse circuitry means to prevent said forward/reverse circuitry means from switching said relay means when said level of current is above a selected value.

10. A DC motor controller, as defined in claim 9, wherein said limit means includes neutral detection means to determine when said controller is in a neutral mode and to permit said forward/reverse circuitry to switch said relay means only when said controller is in said neutral mode.

11. A method of controlling a DC motor, comprising the steps of:
 (a) receiving an input direction control signal;
 (b) providing, responsive to said input direction control signal, output driver signals to a drive transistor in a drive mode and to a regenerative transistor in a regenerative mode;
 (c) providing relay means connected to said transistors to reverse the current flow from said transistors to said motor;
 (d) providing forward/reverse circuitry means connected to said relay means to switch said relay means depending on said input direction control signal;
 (e) measuring the level of current flow through said regenerative transistor and providing a signal representative of said level of current; and (f) preventing said forward/reverse circuitry means from switching said relay means when said level of current is above a selected value.

12. A DC motor controller, as defined in claim 11, further including the step of determining when said controller is in a neutral mode and permitting said forward/reverse circuitry to switch said relay means only when said controller is in said neutral mode.

13. A DC motor controller, comprising:
(a) input means to accept an input control signal representative of desired motor speed and direction;
(b) control means connected to said input means to receive said input control signal and to provide an output control signal to drive and regenerative transistors and drive and regenerative current measuring means, each transistor and each current measuring means adapted to be turned on or off when selected levels of said output voltage signal are exceeded or fallen below; and
(c) means connected to said control means to vary said output control signal as a function of time, when at a first point in time when said regenerative transistor and said regenerative current measuring means are on and said drive transistor and said drive current measuring means are off, will cause; in sequence:
  (i) said regenerative current measuring means to be disabled at a succeeding selected second point in time following said first point in time;
  (ii) said regenerative transistor to be turned off at a succeeding selected third point in time following said second point in time;
  (iii) said drive transistor to be turned off at a succeeding selected fourth point in time following said third point in time;
  (iv) said drive current measuring means to be turned off at a selected succeeding fifth point in time following said fourth point in time;
  (v) said drive current measuring means to be turned off at a succeeding selected sixth point in time following said fifth point in time;
  (vi) said drive transistor to be turned off at a selected selected seventh point in time following said sixth point in time;
  (vii) said regenerative transistor to be turned off at a succeeding selected eighth point in time following said seventh point in time; and
  (viii) said regenerative current measuring means to be turned on at a succeeding selected ninth point in time following said eighth point in time.

14. A DC motor controller, comprising:
(a) input means to accept an input control signal representative of desired motor speed and direction;
(b) control means connected to said input means to receive said input control signal and to provide an output control signal to drive and regenerative transistors and drive and regenerative current measuring means, each transistor and each current measuring means adapted to be turned on or off when selected levels of said output voltage signal are exceeded or fallen below; and
(c) means connected to said control means to vary said output control signal as a function of time;
wherein said control means includes drive and regenerative transistor driver means to provide, in response to said output control signal, drive signals to said drive and regenerative transistors; and said means to vary said output control signal as a function of time comprises:
  (i) resistance means to receive, as an input signal, said output control signal and to provide, as an output signal from said resistance means, an input signal to said drive and regenerative transistor driver means and said drive and regenerative current measuring means; and
  (ii) capacitance means, connected in parallel with said drive and regenerative transistor driver means and said drive and regenerative current measuring means, to receive said output signal from said resistance means and to provide buildup and decay of the level of said output signal from said resistance means.

15. A DC motor controller having drive and regenerative modes, comprising:
(a) input means to receive an input control signal;
(b) control means, responsive to said input control signal, to provide output driver signals to a drive transistor in said drive mode and to a regenerative transistor in said regenerative mode;
(c) current limiting means, connected to said control means, to provide drive and regenerative current limiting in the drive and regenerative modes, respectively; and
(d) current measuring means to measure the current flow through said drive and regenerative transistors by directly measuring the voltage across said transistors and providing input signals to said current limiting means.

* * * * *